United States Patent [19]
Jafri

[11] Patent Number: 6,010,799
[45] Date of Patent: Jan. 4, 2000

[54] CATHODE MEMBER FOR WATER-ACTIVATED STORAGE BATTERY

[75] Inventor: Ash Jafri, Richmond Hill, Canada

[73] Assignee: Prosar Technologies, Deerfield Beach, Fla.

[21] Appl. No.: 09/055,062

[22] Filed: Apr. 3, 1998

Related U.S. Application Data

[60] Provisional application No. 60/042,593, Apr. 3, 1997.

[51] Int. Cl.[7] ................................................. H01M 6/34
[52] U.S. Cl. ........................................... 429/118; 429/119
[58] Field of Search .................................. 429/118, 119, 429/217, 221, 223, 224, 231.5, 231.6, 232

[56] References Cited

U.S. PATENT DOCUMENTS

| | | | |
|---|---|---|---|
| 2,658,935 | 11/1953 | Chubb | 429/119 |
| 4,262,069 | 4/1981 | Devitt et al. | 429/119 X |
| 4,487,821 | 12/1984 | Hakkinen | 429/119 |
| 5,395,707 | 3/1995 | McCarter et al. | 429/119 |
| 5,424,147 | 6/1995 | Khasin et al. | 429/119 |

FOREIGN PATENT DOCUMENTS

| | | |
|---|---|---|
| 872415 | 6/1971 | Canada . |
| 53-4824 | 1/1978 | Japan . |
| 160207 | 1/1964 | U.S.S.R. . |

*Primary Examiner*—Maria Nuzzolillo
*Assistant Examiner*—Susy Tsang
*Attorney, Agent, or Firm*—Schnader, Harrison, Segal & Lewis

[57] ABSTRACT

Disclosed is a water-activated battery, comprising an anode member and a cathode member which comprises a cuprous halide, graphite, and at least Group IV to Group VIII transition metal salt of a chalcogen-containing acid, and can additionally include a 200–400 mesh metal powder.

16 Claims, No Drawings

CATHODE MEMBER FOR WATER-ACTIVATED STORAGE BATTERY

This application claims benefit of Provisional Appl. Ser. No. 60/042,593 filed Apr. 3, 1997.

BACKGROUND OF THE INVENTION

1. Field of the Invention

This invention relates to water-activated batteries, that is so-called deferred action batteries that can be stored dry for prolonged periods and then activated when water or similar liquid is allowed to come in contact with the electrodes. Such batteries find use on life rafts, survival kits and the like to power a signal light for use in an emergency.

2. Prior Art

Khasin U.S. Pat. No. 5,424,147 discloses a water activated battery in which the cathode comprises a skeletal frame including conductive metal and having a portion of its surface area formed as open spaces, and further comprising a heat pressed rigid static bed of active cathode material encompassing the frame and formed of cuprous chloride, sulfur, carbon and a water ionizable salt. The only water ionizable salts disclosed are sodium chloride and calcium sulfate, and a preference is expressed for salts that are sparingly soluble in water having a solubility of less than 50 grams per liter (see col 3 lines 15–16).

McCarter U.S. Pat. No. 5,395,707 discloses a water-activated battery with a cuprous iodide cathode, and a magnesium anode that can contain minor amounts of zinc as an alloy constituent, stated to be functionally comparable to a lead chloride electrode water activated battery.

Rao U.S. Pat. No. 5,225,291 discloses a water actuated battery including a plurality of electrochemical cells including a "hybrid cathode member" which is described (col 3 lines 21–28) as "formed of a material exhibiting inertness (low corrosion) such as nickel, stainless steel, titanium, graphite, carbon, etc., suitably subjected to catalytic activation.

Japan 53-4824 (Yuasa 1978) discloses a sea water battery of specified design in which the cathode contains silver chloride, copper chloride, copper sulphate or manganese dioxide. There is no mention in the English language abstract of graphite as a constituent of the cathode.

Japan 47-43887 (Yuasa 1972) discloses a magnesium salt-water cell including a silver chloride, copper chloride, manganese dioxide, air, etc., cathode and further containing a crystalline or glassy water-soluble weak acid or its anhydride. The only specific "weak acid or anhydride" disclosed in the English abstract is tartaric acid.

Canada 872415 (ESB 1971) discloses a seawater electrolyte battery with a manganese dioxide cathode, and a magnesium or zinc anode. There is no disclosure or suggestion of cuprous chloride or transition metal salt of chalcogen acid constituents of the cathode. Graphite is disclosed as a fabric substrate in a lead dioxide cathode of a cross-referenced application USSR 160207 (Antonov 1964) discloses production of manganesed metal by electrolysis in a cell with an electrolyte of manganese sulfate, ammonium sulfate, and a small amount of added selenious acid. There is no mention in the English abstract of a cuprous halide ingredient Chubb U.S. Pat. No. 2,658,935 discloses a magnesium-cuprous chloride "meteorological" or "one-shot" battery in which the cuprous chloride electrode is porous and contains a cuprous chloride paste containing finely ground cuprous chloride, water, and a solution of a high polymer such as polystyrene in an organic solvent, optionally a plasticizer for the polystyrene, and various inert conductive materials added to improve the conductivity of the cuprous chloride such as carbon black or graphite.

There still remains a need for an improved water-activated battery able to activate rapidly in both salt and fresh water and to maintain its ability to power a signal light for extended periods.

SUMMARY OF THE INVENTION

This invention comprises a water-activated battery, comprising an anode member and a cathode member which comprises a cuprous halide, graphite, and at least Group IV to Group VIII transition metal salt of a chalcogen-containing acid. The battery can be stored in a dry condition and activated at the time of use by the addition of an aqueous solvent such as fresh water or sea water.

DETAILED DESCRIPTION OF THE INVENTION AND PREFERRED EMBODIMENTS

As a result of an unexpected and advantageous interaction of cuprous halide, graphite, and Group IV to Group VIII transition metal salt of chalcogen acid components of the cathode member, a battery according to this invention activates rapidly, within 60 seconds after immersion, in either sea water or fresh water, and attains a higher voltage than batteries lacking any one of the essential components. A practical benefit of this rapid activation is seen in a signal light powered by a battery according to this invention. Such a signal light attains a light intensity of one candela within 60 seconds after immersion, in either sea water or fresh water. A further advantage of this invention is the maintenance of the light intensity of a signal light according to this invention for at least 8 hours of continuous service. Additional advantages of the water-activated battery of this invention and signal light powered by such battery include the ability to withstand prolonged storage under varied conditions of temperature and humidity prior to activation and use without loss of rapid activation, achievement of high light intensity, and durability thereof. A further advantage of the water-activated battery of this invention is the absence of noticeable odor throughout storage and use. Yet another advantage of the water-activated battery of this invention is the absence of appreciable hygroscopicity, which permits simplification of the required packaging for shipment and storage before use.

In a preferred water-activated battery according to this invention, the cathode member comprises 50 to 95 parts by weight of cuprous halide, 2 to 15 parts of graphite, 3 to 50 parts by weight of Group IV to Group VIII transition metal salt of chalcogen acid and 0 +25 parts of metal powder. Proportions are based on the contained amount of anhydrous salt.

Preferred transition metal salts of chalcogen acids include salts of the first row of transition metals in the Periodic Table from titanium to nickel and salts of the second row of transition metals in the Periodic Table from zirconium to molybdenum with chalcogen acids and particularly with chalcogen oxy-acids such as sulfurous acid, sulfuric acid, selenious acid, and selenic acid. Particularly preferred are transition metal salts in the most stable valence of the transition metal, without strong reducing or oxidizing properties. Mixtures of more than one salt can be used. Thus, particularly preferred salts include titanyl sulfate, vanadyl sulfate, chromic sulfate, manganous sulfite, manganous sulfate, ferrous sulfate, ferrous ammonium sulfate, ferric sulfate, cobalt sulfate, nickel sulfate, nickel sulfite, and zirconyl sulfate.

The effective cuprous halides include cuprous fluoride, cuprous chloride, cuprous bromide, cuprous iodide and mixtures thereof. Readily available commercial grades of cuprous halide and the transition metal salts can be used according to this invention with excellent results. Cuprous chloride is preferred.

Anhydrous cuprous halides and transition metal salts as well as equivalent amounts of moist or hydrated salts can be used as available.

The graphite in the cathode member according to this invention imparts important advantages. One vital role of the graphite component is its contribution to the rapid activation of the battery upon immersion in fresh water. Another important function of the graphite component is lubricating and coating the particles of cuprous halide and transition metal salt when present so as to result in a less hygroscopic composition. A further important feature of the graphite component is that in its presence the parts can be plated by known electrolytic or electroless techniques with metals such as copper, nickel, or silver. Such plating can become a base to which a copper or silver wire can be soldered, as a faster method of production than embedding such wire inside the plate or die.

Many forms of graphite effective according to this invention are commercially available, including a Dixon Ticonderoga Co (Lakehurst N.J. 08733) grade of Natural Flake Graphite having specific gravity approximately 2.2 and containing maximum 5% ash and minimum 95% carbon by weight loss upon ignition, of which 98.7% passes a 325 mesh screen.

Metal powder additives to the cathode member of this invention when present include zinc, copper, and other metals having particle size of 200 to 400 mesh In a water-activated battery according to this invention, the cathode member additionally can include an organic polymer binder capable of melting and fusing the mixture at 140–210° F. (60–99° C.) to result in a solid state upon cooling. Suitable polymer binders include polyethylene, polypropylene, ethylene—vinyl acetate copolymers, polyvinyl chloride and copolymers of vinyl chloride with other monomers such as vinyl acetate and/or maleic anhydride. Vinyl chloride polymers are preferred. The amount of binder when present can range from 3 to 15 parts by weight per 100 parts by weight of cuprous halide and transition metal salt combined.

The anode member in a water activated battery according to this invention is a metallic element such as aluminum, magnesium, zinc and alloys thereof Magnesium is preferred.

Spacer members spacing said cathode member from said anode member in a water-activated battery according to this invention can comprise (a) plastic clips to hold the cathode and anode members apart without interfering with the free flow of water through the battery, or (b) a woven or non woven fabric wrapped around the cathode insulating anode from cathode. The advantage of (b) is that the cathode and anode can now be in intimate contact while still achieving insulation value and minimizing the distance between the two electrodes.

In a water-activated battery according to this invention, the cathode and anode members can be retained with any convenient reclosable carrier able to protect the members from physical abuse and damage. The carrier can be something as simple as a reclosable plastic bag. A close-fitting battery casing including a lid portion and openings for water to flow in and out of can be used if desired. The carrier is kept closed until the battery is to be used, and then opened or removed altogether.

Lead wires are connected to the cathode and anode members and extend outward to a light source or other device powered by the battery. The battery carrier can be made of any material resistant to the contents of the battery and the environment, suitably a light weight plastic.

In order to provide connection between the cathode and anode members, a wire mesh of copper or nickel with sufficient rigidity can be imbedded within the cathode member during the manufacturing process with a wire protruding from the mesh as the cathode's external connection. Alternatively, a copper, tinned, or silver wire can be wrapped around the cathode providing the same effect as the mesh. A third choice may be a single wire imbedded inside the cathode during manufacture.

In its primary intended use, the battery is immersed in water at the point of use. A method of battery use includes opening or removal of the carrier by the user so that the water is free to flow into the battery, whereupon the water activates the battery, functioning as a conductor receiving and suspending cations and anions from the cathode and anode members at a pre-set potential difference. Preferably, the battery is able to produce a voltage and current sufficient to light a light source which is visible for up to one mile and is able to produce at least 1.03 volt for 8 hours.

The following non-limiting examples are presented to illustrate a few of the embodiments of the invention.

EXAMPLE 1

A mixture was prepared of cuprous chloride, 75 parts by weight, manganese sulfate monohydrate, 19 parts by weight, graphite (Grade HPN-2 from DIXON TICONDEROGA CO.) 3 parts by weight, and VMCA (Union Carbide) vinyl chloride copolymer 3 parts by weight. The materials were ground to a fine powder until the mixture was uniform in color and appearance. Approximately 12 grams of the mixture was pressed in a punch and die to form a plate or tablet at approximately 200° F. (93° C.). Prior to pouring the powder into the cavity, a silver wire about 0.02–0.03 inches in diameter formed in the shape of a figure-eight was placed in the cavity to perform the function of a lead wire from the cathode. The resulting tablet or plate measured 2.5 by 0.75 by 0.100 inches.

The cathode thus prepared was assembled with plastic clip insulators between cathode and two anodes made of magnesium and inserted in a plastic case. The lead wires from cathode and anodes were connected to a bulb rated at 1.5 volts.

This assembly has been tested and found to meet all required functions for an emergency signal light including activation in fresh water. Comparisons have shown that the interaction of the graphite ingredient with the other ingredients not only provides coverage protecting against the elements but also is responsible for start-up in fresh water; a comparable cathode without graphite does not function at all in fresh water and a comparable cathode with graphite but without Group IV to Group VIII transition metal salt according to this invention functions poorly in fresh water.

EXAMPLE 2 AND COMPARISONS A, B, AND C

Cathodes were prepared as in Example 1 from the formulations shown below, assembled with plastic clip insulators between cathode and two anodes made of magnesium and inserted in a plastic case, and connected to a bulb rated at 1.5 volts. Each resulting assembly was tested in fresh water and in salt water. Results are shown below.

| Composition | Example 2 | Comparison A | Comparison B | Comparison C |
|---|---|---|---|---|
| Cuprous chloride | 75% | 85% | 94% | 90% |
| Manganous sulfate | 19% | none | none | none |
| Graphite | 3% | 8% | 2% | none |
| Metal powder (zinc) | none | none | none | 5% |
| Vinyl binder (VMCH) | 3% | 7% | 4% | 5% |
| Fresh water start voltage | 1.14 | 1.01 | 0.62 | 1.07 |
| Salt water start voltage | 1.41 | 1.31 | 1.33 | 1.32 |

The results show all four formulations starting up sufficiently in salt water with Example 2 containing graphite and additive according to the invention best. However, only Example 2 starts up sufficiently in fresh water while Comparison A and Comparison C are marginal and Comparison B is quite inferior.

While the invention has been described and exemplified in detail herein, various alternatives, alterations, and modifications should become apparent to those skilled in this art without departing from the spirit and scope of the invention.

What is claimed is:

1. A water-activated battery, comprising an anode member and a cathode member which comprises a cuprous halide, graphite, and a transition metal salt selected from the group consisting of Group IV to Group VIII transition metal salt of a chalcogen-containing acid.

2. A water-activated battery according to claim 1 which can be activated in sea water or fresh water.

3. A water-activated battery according to claim 1 in which the transition metal salt selected from the group consisting of Group IV to Group VIII transition metal salt is a salt of sulfuric acid.

4. A water-activated battery according to claim 3 in which the transition metal salt is manganous sulfate.

5. A water-activated battery according to claim 3 in which the transition metal salt is cobalt sulfate.

6. A water-activated battery according to claim 1 additionally comprising 200–400 mesh zinc metal.

7. A water-activated battery according to claim 1 in which the anode member comprises magnesium metal.

8. A water-activated battery according to claim 1 in which the cathode member additionally includes an organic polymer binder capable of melting and fusing the mixture to a solid state upon cooling.

9. A water-activated battery according to claim 8 in which the binder is polyvinyl chloride.

10. A water-activated battery according to claim 1 in which the cathode member comprises 50 to 95 parts by weight of cuprous halide, 2 to 15 parts by weight of graphite, 3 to 50 parts by weight of a transition metal salt selected from the group consisting of Group IV to Group VIII transition metal salt of chalcogen acid, and 0 to 25 parts of metal powder.

11. A water-activated battery according to claim 10 in which the cuprous halide is cuprous chloride.

12. A water-activated battery according to claim 1 having a single cell.

13. A water-activated battery according to claim 1 able to produce a voltage and current sufficient to light a light source which is visible for up to one mile.

14. A water-activated battery according to claim 1 in which activation takes place within 60 seconds after water enters a carrier of the battery.

15. A water-activated battery according to claim 1 able to produce at least 1.03 volt for 8 hours.

16. A signal light assembly comprising a light-transmitting cover, a water-activated battery according to claim 1, at least one light bulb, and connectors to complete an electrical circuit.

* * * * *

UNITED STATES PATENT AND TRADEMARK OFFICE
CERTIFICATE OF CORRECTION

PATENT NO.   : 6,010,799
DATED        : January 4, 2000
INVENTOR(S)  : Ash Jafri It is certified that error appears in the above-identified patent and that said Letters Patent is hereby corrected as shown below:

Column 2,
Line 54, change "+25" to -- to 25 --.

Column 4,
Between lines 29 and 30, insert the following paragraph:
-- The invention also includes a light assembly including a light-transmitting cover, a water activated battery as described above, at least one light bulb and connectors to complete the electrical circuit. --

Signed and Sealed this

Twenty-sixth Day of November, 2002

*Attest:*

JAMES E. ROGAN
*Attesting Officer*   *Director of the United States Patent and Trademark Office*